(12) United States Patent
Torsner et al.

(10) Patent No.: US 8,311,062 B2
(45) Date of Patent: Nov. 13, 2012

(54) METHOD AND ARRANGEMENT FOR ALIGNMENT OF PROTOCOL DATA UNITS IN A WIRELESS COMMUNICATION SYSTEM

(75) Inventors: Johan Torsner, Masaby (FI); Magnus Lindström, Spånga (SE); Janne Peisa, Espoo (FI); Mats Sågfors, Kyrkslätt (FI); Stefan Wager, Espoo (FI); Henning Wiemann, Aachen (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 500 days.

(21) Appl. No.: 12/519,261

(22) PCT Filed: Nov. 9, 2007

(86) PCT No.: PCT/SE2007/050834
§ 371 (c)(1),
(2), (4) Date: Jun. 15, 2009

(87) PCT Pub. No.: WO2008/073024
PCT Pub. Date: Jun. 19, 2008

(65) Prior Publication Data
US 2010/0046405 A1 Feb. 25, 2010

(30) Foreign Application Priority Data
Dec. 14, 2006 (SE) ...................................... 0602722

(51) Int. Cl.
*H04J 3/24* (2006.01)
(52) U.S. Cl. ......... 370/474; 370/466; 370/471; 370/476
(58) Field of Classification Search .................. 370/310, 370/351, 389, 392, 465, 466, 469, 471, 473, 370/474, 476
See application file for complete search history.

(56) References Cited

U.S. PATENT DOCUMENTS

| 6,807,192 | B2 | 10/2004 | Terry | |
|---|---|---|---|---|
| 7,400,649 | B2* | 7/2008 | Yi et al. | 370/469 |
| 2001/0052091 | A1* | 12/2001 | Goldsack et al. | 714/704 |
| 2002/0001314 | A1* | 1/2002 | Yi et al. | 370/469 |
| 2005/0185608 | A1* | 8/2005 | Lee et al. | 370/328 |

(Continued)

FOREIGN PATENT DOCUMENTS

CN 139576 A 7/2001

OTHER PUBLICATIONS

Tdoc R2-063119. "Byte alignment of L2 header", Samsung, 3GPP TSG-RAN2 Meeting #56, Riga, Latvia, Nov. 6-10, 2006, http://www.3gpp.org/ftp/tsg_ranlWG2_RL2/TSGR2_56/Documents/ see the whole document.

(Continued)

Primary Examiner — Kwang B Yao
Assistant Examiner — Nguyen Ngo

(57) ABSTRACT

The present invention relates to a method and arrangement for communicating a Protocol Data Unit (PDU) between a transmitter unit and a receiver unit in a wireless communication network. Said PDU comprising protocol headers associated with at least a first and a second protocol layers involved in the communication and a payload to be communicated. The method comprises the step of interacting between the at least first and second protocol layers, such that the sum of the bits of the protocol headers is n-bit aligned such as octet aligned independently of non-alignment of at least one of the protocol headers comprised in the PDU.

25 Claims, 6 Drawing Sheets

U.S. PATENT DOCUMENTS

| | | | |
|---|---|---|---|
| 2006/0067324 A1* | 3/2006 | Kim et al. | 370/395.2 |
| 2006/0140158 A1* | 6/2006 | Terry | 370/335 |
| 2007/0133605 A1* | 6/2007 | Herrmann | 370/473 |
| 2008/0089285 A1* | 4/2008 | Pirskanen et al. | 370/329 |
| 2010/0290400 A1* | 11/2010 | Lee et al. | 370/328 |
| 2011/0191532 A1* | 8/2011 | Hepler et al. | 711/105 |

OTHER PUBLICATIONS

Tdoc R2-070252, "Byte alignment for user plane protocols in LTE", Ericsson, TSG-RAN WG2 Meeting #56bis Sorrento Italy, Jan. 15-19, 2007, see the whole document.

* cited by examiner

METHOD AND ARRANGEMENT FOR ALIGNMENT OF PROTOCOL DATA UNITS IN A WIRELESS COMMUNICATION SYSTEM

FIELD OF THE INVENTION

The present invention relates to methods and arrangements in a communications system and in particular to n-bit, such as octet, alignments of protocol data units in a wireless communications system.

BACKGROUND

3GPP LTE is a project within the 3$^{rd}$ Generation Partnership Project (3GPP) to improve the UMTS (Universal Mobile Telecommunications System) standard to cope with future requirements in terms of improved services such as higher data rates, improved efficiency, lowered costs etc.

When specifying the link layer protocols for LTE, the protocols PDCP (Packet Data Convergence Protocol), RLC (Radio Link Control) and MAC (Medium Access Control) it has been identified that it would be desirable that the protocol headers should, if possible, be octet aligned. It has already been decided that the PDCP header should be octet aligned and it is likely that RLC and MAC also becomes octet aligned. Octet aligned implies that a protocol field occupies a multiple of 8 bits. I.e. a protocol header that is 6 bits is not octet aligned, but if it is 8 or 16 bits or 32 bits it is octet aligned. Generally, a protocol header is octet aligned if the data part starts in an octet aligned position. This concept can be generalized to n-bit alignment. I.e., a protocol header is n-bit aligned if a multiple of n bits occupies the header, where n may be 8, 16, 32 or any other integer value.

The main motivation to have the RLC and MAC headers octet aligned is reduced processing requirements. This is illustrated in FIG. 1. If the headers are not octet aligned which implies that the payload would start in a non-octet aligned position, the receiver of the PDU (Protocol Data Unit) would need to move (shift) the whole payload to a new position in the memory before further processing. This operation, which is illustrated in FIG. 1, often requires significant processing and should therefore be avoided.

A straight forward solution is to design both the RLC and the MAC header to be an integer number of octets. This solution is proposed in document R2-063119, "Byte alignment of L2 header", Samsung, published Nov. 6, 2006 during 3GPP TSG-RAN2 Meeting #56.

If no consideration to octet alignment is taken, the RLC headers and MAC headers would be optimized to be as short as possible and typically they will not comprise of an integer number of octets. In order to make the RLC and MAC header octet aligned, padding needs to be added in both these layers resulting in an unnecessary large overhead.

This is also complicated by the fact that the RLC and MAC headers do not have a fixed size. For RLC the header size typically varies depending on if concatenation is applied, if segmentation or re-segmentation is applied and potentially also depending on the RLC PDU size. A length indicator indicating the length of the payload is foreseen to be included and the length of the length indicator can potentially vary depending on the RLC PDU size. Similarly, the length of the MAC header varies depending on if multiplexing is applied or not. Thus the total RLC or MAC header can be modeled as a base header that is always present and extensions (denoted E1, E2) that are different depending on the data transmitted in a TTI (Transmission Time Interval). In order to assure that the headers are always octet aligned it may thus be necessary to have both the base headers and the extensions octet aligned. This is illustrated in FIGS. 2a and 2b. FIG. 2a shows a simple case with only the minimum base headers, i.e. where no header extensions are used. Here, padding is added on both RLC and MAC to assure that the respective headers are octet aligned. In another example shown in FIG. 2b, header extensions are used in both RLC and MAC due to that re-segmentation is done in RLC and multiplexing in MAC. This requires that padding is added on several places as illustrated in FIG. 2b.

It is evident that the straight forward solution of assuring that both the RLC header and MAC header are octet aligned in all cases may require unnecessarily large padding.

SUMMARY

Thus the object of the present invention is to achieve a solution that avoids unnecessarily large padding.

This is achieved by a solution that is based on the idea that it is not necessary that the individual protocol headers or extensions are octet aligned. Hence, it is sufficient if it is assured that the payload starts in an octet aligned position.

Thus in accordance with a first aspect of the present invention a method for communicating a PDU between a transmitter unit and a receiver unit in a wireless communication network is provided. Said PDU comprises protocol headers associated with at least a first and a second protocol layers involved in the communication and a payload to be communicated. The method comprises the step of interacting between the at least first and second protocol layers, such that the sum of the bits of the protocol headers is n-bit aligned e.g. octet aligned independently of non-alignment of at least one of the protocol headers comprised in the PDU.

In accordance with a second aspect a transmitting unit, such as a Node B or a UE, capable of transmitting PDUs in a wireless communication network is provided. Said PDU comprises protocol headers associated with at least a first and a second protocol layers involved in the communication and a payload to be communicated. The transmitting unit comprises means for interacting between the at least first and second protocol layers, such that the sum of the bits of the protocol headers is n-bit aligned e.g. octet aligned independently of non-alignment of at least one of the protocol headers comprised in the PDU.

According to embodiments of the present invention a rule is specified that states that the payload field starts at the first octet aligned position following the total length of the protocol header bits.

An advantage with the present invention is that it enables non-octet-alignment of the individual headers while maintaining octet alignment of the payload. This enables minimizing overhead associated with multiple levels of alignment to different word sizes.

BRIEF DESCRIPTION OF THE DRAWINGS

The foregoing and other objects, features and advantages of the invention will be apparent from the following detailed description of preferred embodiments as illustrated in the drawings.

DETAILED DESCRIPTION

In the following, the invention will be described in more detail with reference to certain different embodiments. The protocols involved in the communication are hereinafter represented by RLC and MAC protocols. RLC (Radio Link Control) and MAC (Media Access Control) are both layer 2 protocols. RLC provides transmission towards MAC on logical channels and provides three transmission modes, transparent, acknowledged and unacknowledged mode. MAC resides between the physical layer (Layer 1) and the RLC and is responsible for mapping between transport channels and logical channels. It should however be understood that the invention is by no means limited to these protocols, and that the invention can be applied to any protocol layers.

Moreover, in the description below the n-bit alignment is being exemplified by 8-bit alignment, also referred to octet alignment. However, the present invention is not limited to the situation of n=8, other examples are also discussed. E.g. the invention can be extended to provide e.g. 32 bit alignment or 64 bit alignment which may be beneficial in certain applications where 32 bit or 64 bit processors are used.

Figure 1:
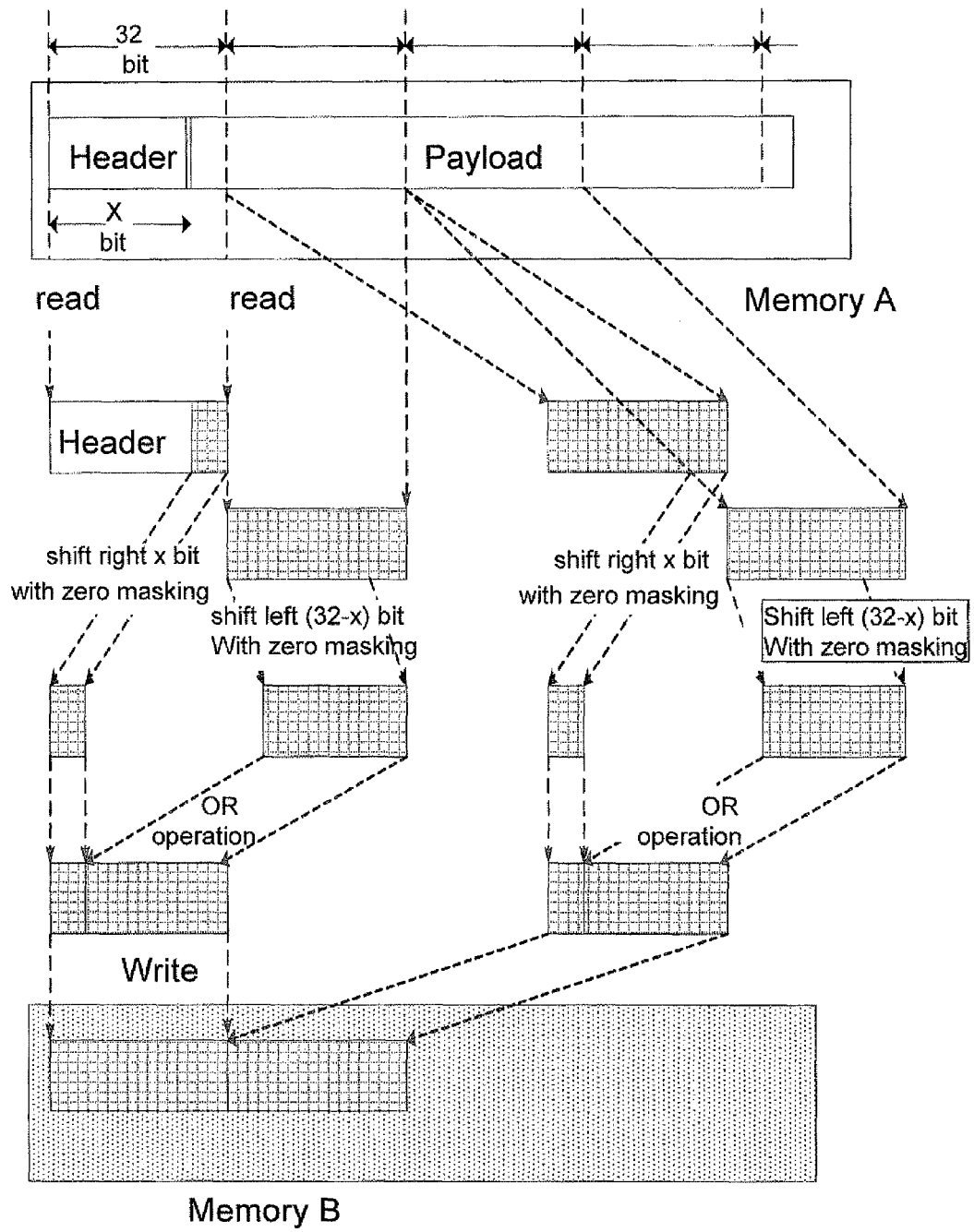
FIG. 1 illustrates of the steps required to move the payload when the headers are not octet aligned in accordance with prior art.
Figure 2A:
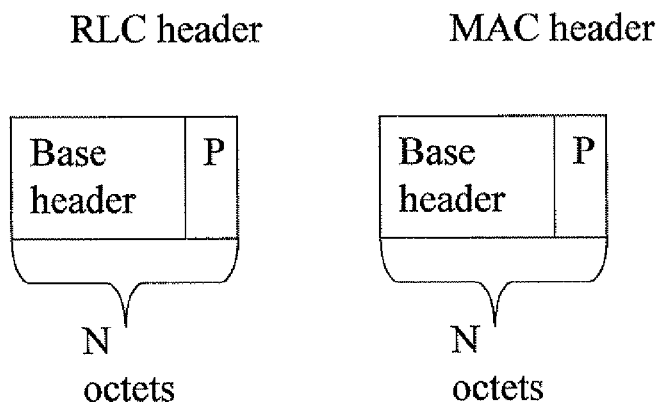
FIGS. 2a and 2b illustrate the padding (P) needed to assure that both RLC and MAC headers are octet aligned in cases with and without header extensions (E) according to prior art.
Figure 2B:
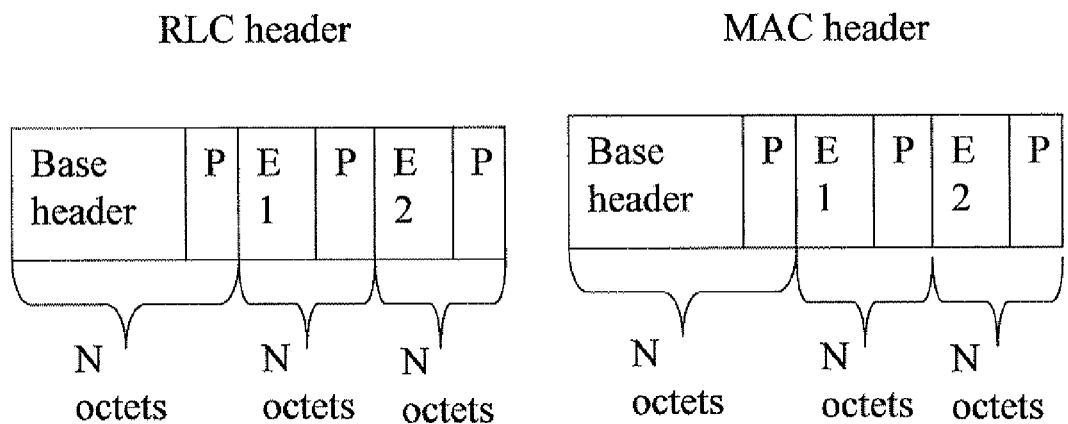
Figure 3:
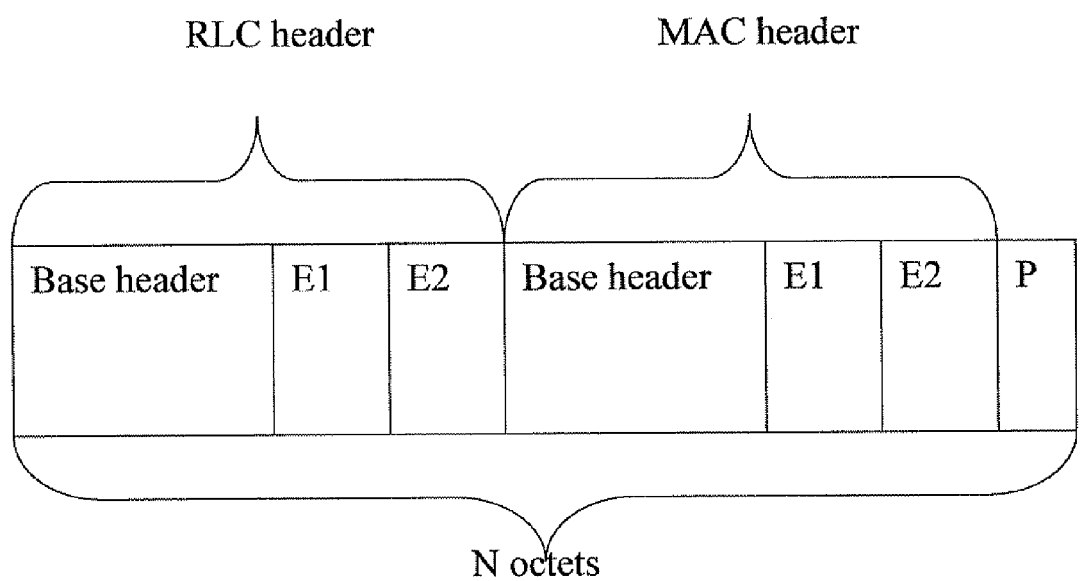
FIG. 3 illustrates the basic principle of the present invention. (It should be noted that the interaction between the layers is not shown)

The invention is based on the idea that it is not necessary that the individual protocol headers or extensions are n-bit aligned, e.g. octet aligned. It is sufficient if the sum of the protocol headers are n-bit aligned, e.g. octet aligned, which is illustrated in FIG. 3. It can then be assured that the payload starts in an octet aligned position. This can be achieved in a more efficient way than the straight forward solution according to prior art.

Figure 5:
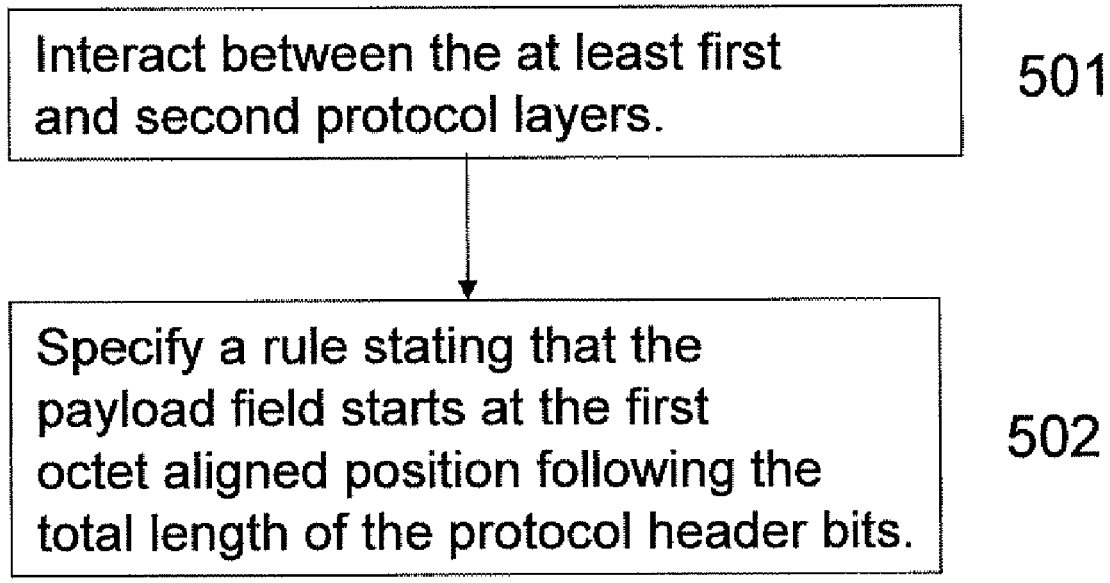
FIG. 5 is a flowchart illustrating a method according to one embodiment of the present invention.

More specifically and with reference to FIG. 5, the present invention relates to a method for communicating a PDU between a transmitter unit and a receiver unit in a wireless communication network, said PDU comprising protocol headers associated with at least a first and a second protocol layers involved in the communication and the payload to be communicated. The method according to one embodiment is illustrated in the flowchart of FIG. 5 and comprises the steps of 501. Interact between the at least first and second protocol layers, such that the sum of the bits of the protocol headers is n-bit aligned e.g. octet aligned independently of non-alignment of at least one of the protocol headers comprised in the PDU.

502. Specify a rule stating that the payload field starts at the first octet aligned position following the total length of the protocol header bits.

Figure 6:
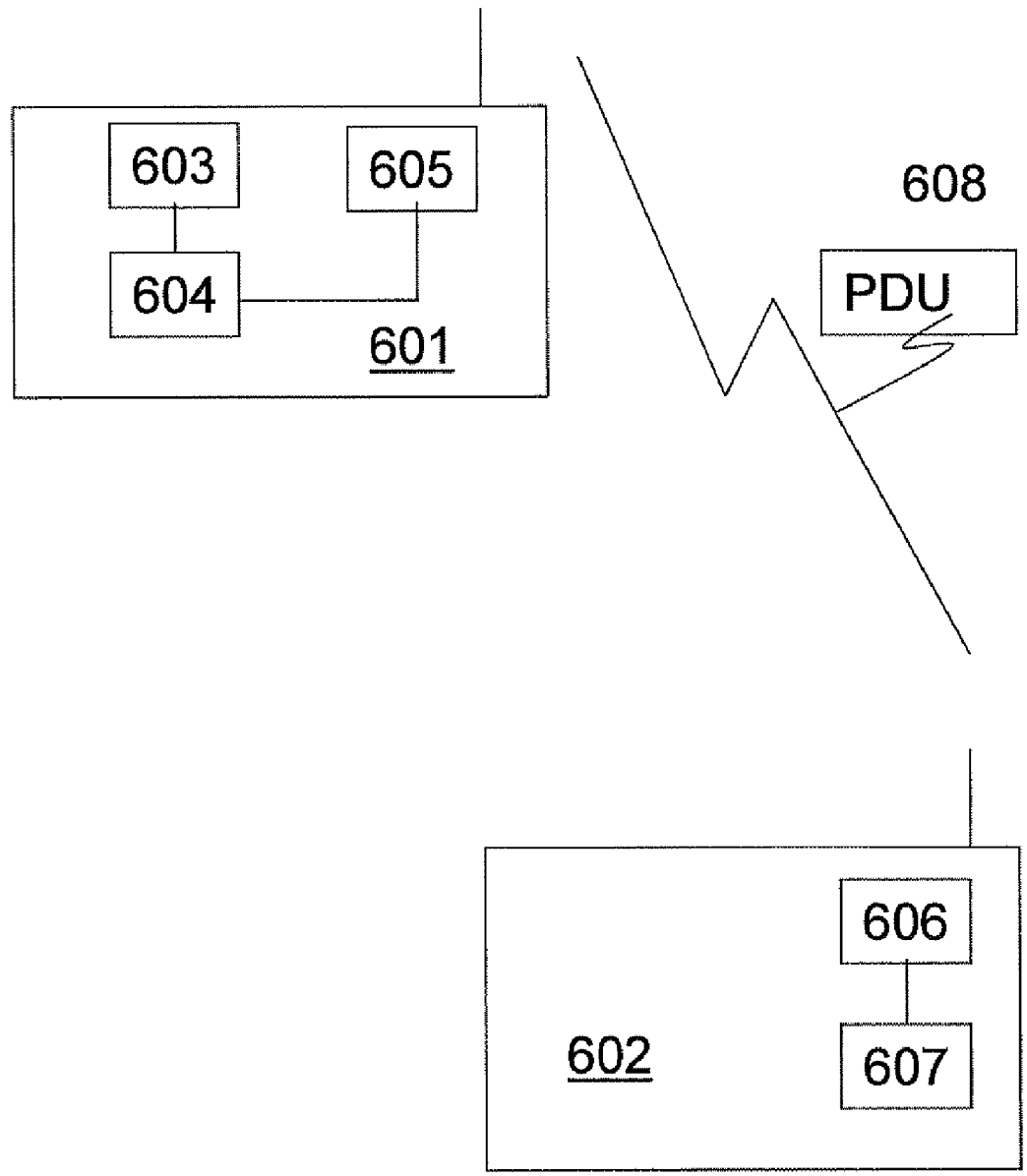
FIG. 6 illustrates an embodiment of the present invention.

Turning to FIG. 6, the present invention furthermore relates to a transmitting unit 601 capable of transmitting PDUs 608 in a wireless communication network. Said PDUs 608 comprising protocol headers associated with at least a first and a second protocol layers involved in the communication and a payload to be communicated. The transmitting unit 601 according to the present invention comprises means 603 for interacting between the at least first and second protocol layers, such that the sum of the bits of the protocol headers is n-bit aligned independently of non-alignment of at least one of the protocol headers comprised in the PDU. In accordance with an embodiment the transmitting unit comprises means 604 for specifying a rule stating that the payload field starts at the first octet aligned position following the total length of the protocol header bits and means 605 for transmitting the PDU accordingly.

The transmitting unit may be comprised in a radio base station such as a Node-B or in a user equipment such as a mobile telephone.

A receiving unit 602 is capable of receiving said PDUs 608 in the wireless communication network. The receiving unit 602 comprises means 606 for receiving PDUs 608 wherein an interaction between the at least first and second protocol layers has been performed in the transmitting unit, such that the sum of the bits of the protocol headers is n-bit aligned e.g. octet aligned independently of non-alignment of at least one of the protocol headers comprised in the PDU. The receiving unit 602 may comprise means 607 for applying a rule stating that the payload field starts at the first octet aligned position following the total length of the protocol header bits.

The receiving unit may be comprised in a user equipment or in a radio base station such as a Node-B.

The invention makes it possible to achieve octet alignment such that the sum of several protocol headers are octet aligned while keeping all header fields as short as possible. I.e., the simplest way to achieve octet alignment when there are two protocol layers such as MAC and RLC is to make sure that both protocols are octet aligned. I.e. if the MAC header is 8 bits and the RLC header is 16 bits, the total header will also be octet aligned. In accordance with the present invention, octet alignment can also be achieved if the MAC header is e.g. 5 bits and the RLC header is e.g. 3 bits. Thus the total protocol is octet aligned in the sense that the data part starts in an octet aligned position.

In accordance with prior art, the RLC and MAC headers and their extensions are designed as short as possible without consideration to octet alignment. According to the invention, a rule is specified stating that the payload starts at the first octet aligned position after the total header e.g. comprising RLC and MAC headers. Thus the total header will always be octet aligned while the individual protocol headers, in this case RLC and MAC headers, are not necessarily octet aligned. Therefore, an advantage with the present invention is that it is possible to have extensions in one of the protocol layers that are a few bits instead of a whole octet.

Interaction between the involved protocols layers is required in order to achieve the octet alignment according to the invention. The interaction between the protocol layers can be done in different ways according to the described embodiments below. As mentioned above, the protocol layers is here exemplified by the RLC and MAC layers, but the present invention is not limited to these protocols.

In a first embodiment, the RLC layer simply delivers the complete RLC PDU (Protocol Data Unit) to MAC where the RLC header is not necessarily octet aligned. This may require that the MAC layer shifts the payload to an octet aligned position before transmission. The shifting of the payload to an octet aligned position is only required when the RLC header is not octet aligned. The MAC layer adds the MAC header to the RLC header which is not necessarily octet aligned. Finally the MAC layer adds header padding constituted by 0 . . . 7 bit to assure that the total header constituted by the RLC and the MAC headers including padding is octet aligned and that the payload starts in an octet aligned position accordingly. Preferably, the MAC header padding is placed after the MAC and RLC header and before the payload.

In a second embodiment of the present invention, the RLC layer delivers the RLC header separate from the payload to MAC in two different containers or referenced by two different pointers. This means that the payload does not have to be shifted in MAC before transmission. The MAC layer adds the MAC header which is not necessarily octet aligned to the RLC header. Finally the MAC adds header padding constituted by 0 ... 7 bit to assure that the total header including padding is octet aligned and that the payload starts in an octet aligned position.

In a third embodiment the RLC layer first assures that the total RLC header is octet aligned by adding 0 ... 7 bit as RLC header padding. Then RLC delivers the complete RLC PDU to MAC. This means that the payload does not have to be shifted in MAC before transmission. Thus, if RLC header is 3 bit and MAC header is e.g. 7 bit it means that RLC adds 5 bit padding to make the RLC PDU header octet aligned. Then (as said below) MAC adds its own header and sets the total header padding to 6 bit so that the RLC+MAC+padding is 16 bit (octet aligned).

The MAC layer adds to the RLC header the MAC header which is not necessarily octet aligned. Finally MAC modifies the padding that was added by the RLC layer such that the total MAC and RLC headers together becomes octet aligned and the payload starts in an octet aligned position. Preferably, the header padding is placed after the MAC and RLC header and before the payload.

In a fourth embodiment it is preferred, even though not required, that the header padding is prepended (i.e. the padding is prefixed to the header), rather than appended to the header end.

Figure 4:
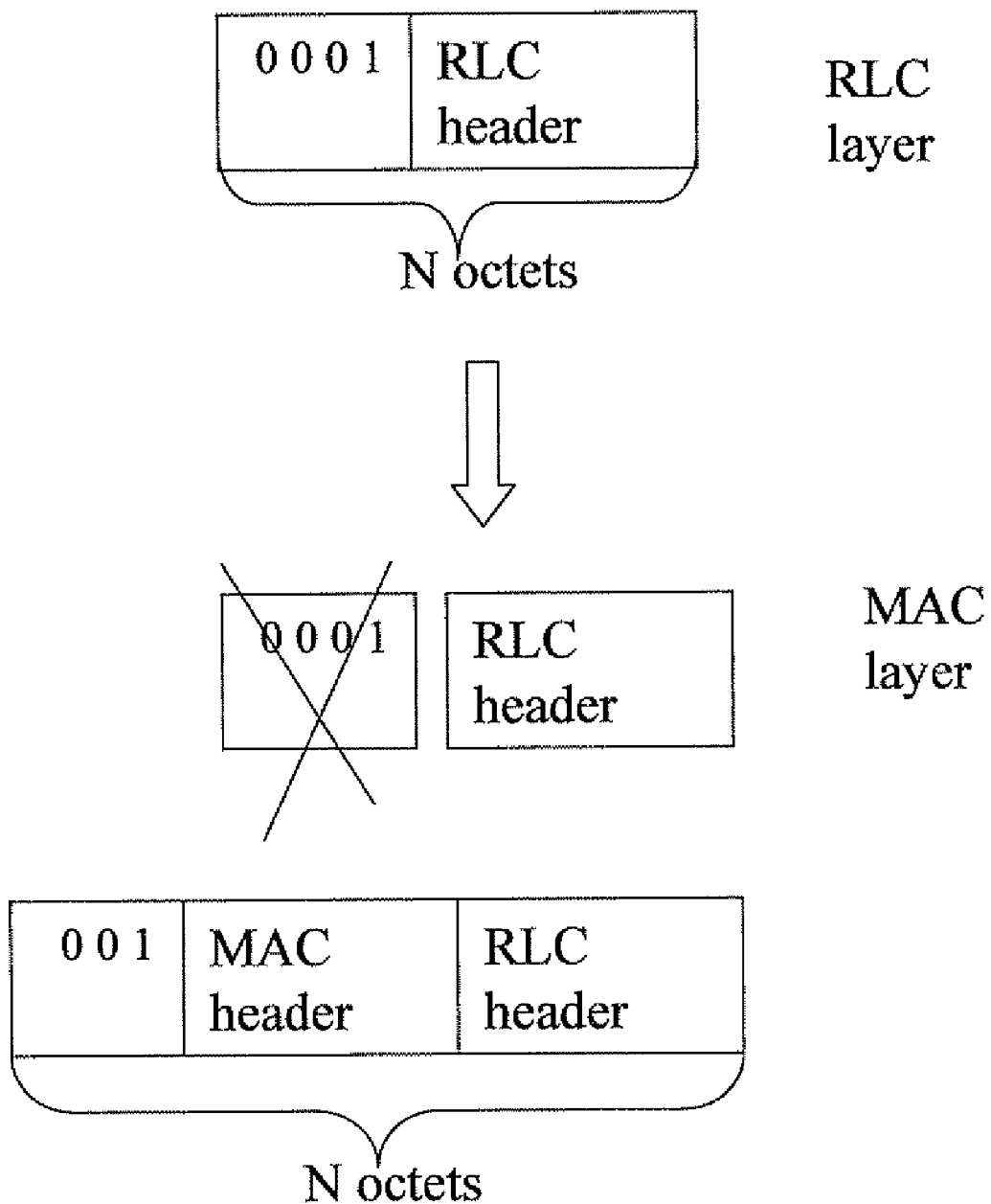
FIG. 4 illustrates the prepending of header padding bits according to the fourth embodiment of the present invention.

Turning now to FIG. 4 illustrating that the RLC layer first prepends a 'start' bit to the RLC header and assures that the (total) RLC header (including the 'start' bit) is octet aligned by prepending for example 0 ... 7 bits of leading zeros to the RLC header such that the end of the padding and thus the beginning of the RLC header is distinguishable. In this way, MAC knows how much padding that RLC has added. Obviously other bit patterns that fulfill this requirement can be applied, for example 0 ... 7 bits of leading digits with value one. Then the RLC delivers the complete RLC PDU to MAC. This means that the payload does not have to be shifted in MAC before transmission. This embodiment together with an example of a suitable bit pattern of the padding is illustrated in FIG. 4.

According to the fourth embodiment, the MAC layer removes the leading-zero-padding 'start' bit(s) (or with a padding having any other bit pattern fulfilling its purpose as explained in the foregoing) from the MAC SDU, prepends the not necessarily octet aligned MAC header, then prepends a 'start' bit and pads with 0 ... 7 leading zeros to ensure octet alignment of the aggregate (MAC and RLC) header. Then the total header is octet aligned so the PDU including the header and the data data part is submitted to lower layers for transmission.

According to a fifth embodiment, the invention according to any of the previous embodiments can be generalized to the case when headers are placed at the end of the payload rather than at the beginning; i.e. when trailing headers, or trailers for short, are used instead of leading headers. The trailers are, typically, bit-order-reversed versions of the headers (padding inclusive) and appended rather than prepended to the payload. Instead of reverse the bit-order of the header it is also possible to reverse only the order of the header fields. For fixed-size headers, bit-order-reversing is not necessary; changing the order of header and padding is sufficient.

In this embodiment, being located first in the PDU, the payload is always octet aligned and will not need shifting. Hence, padding can be adjusted to fit non-integer-octet PDU sizes while maintaining payload octet-alignment. Unlike the other solutions this fifth embodiment requires only one padding field between payload and header instead of two padding fields (one for the header and one for the payload).

The invention according to any of the previous embodiments can be extended to more than two protocol layers such that the total protocol is octet aligned without requiring that any individual protocol header or extension field is octet aligned.

While the invention has been described in connection with what is presently considered to be the most practical and preferred embodiments, it is to be understood that the invention is not to be limited to the disclosed embodiments, but is intended to cover various modifications within the scope of the appended claims. Even though references to LTE systems are made in the text, it is to be understood that the invention can be applied, where appropriate, for any system or protocol.

The invention claimed is:

1. A method, comprising:
communicating a Protocol Data Unit, PDU, between a transmitter unit and a receiver unit in a wireless communication network, said PDU comprising protocol headers associated with at least a first and a second protocol layers involved in the communication and a payload to be communicated; and
interacting between the at least first and second protocol layers, such that the sum of the bits of the protocol headers is n-bit aligned independently of non-alignment of at least one of the protocol headers comprised in the PDU, wherein n is a positive integer.

2. The method according to claim 1, comprising the further step of specifying a rule stating that the payload field starts at the first octet aligned position following the total length of the protocol header bits.

3. The method according to claim 1, wherein the step of interacting comprises the further step of adding a protocol header of the second protocol to a complete PDU comprising at least a header of the first protocol and a payload.

4. The method according to claim 1, wherein the step of interacting comprises the further step of adding a protocol header of the second protocol to a PDU comprising at least a header of the first protocol and a payload, wherein the header of the first protocol and the payload of the PDU are delivered separately to the second protocol.

5. The method according to claim 1, wherein the step of interacting is performed by providing padding between the protocol header bits and the payload comprised in said PDU.

6. The method of claim 1, wherein the sum of the bits of the protocol headers is n-bit aligned independently of non-alignment of at least two of the protocol headers comprised in the PDU.

7. The method according to claim 1, wherein the step of interacting is performed by providing padding to the protocol header bits comprised in said PDU.

8. The method according to claim 1, wherein the headers including possible padding are appended to the payload.

9. The method according to claim 1, wherein the first protocol layer involved in the communication comprises the RLC (Radio Link Control) layer and the second protocol layer is MAC (Medium Access Control) layer.

10. The method according to claim 2, wherein said rule provides 8 bit alignment.

11. The method according to claim 2, wherein said rule provides 32 bit alignment or 64 bit alignment or 128 bit alignment where this is beneficial for the processing.

12. A transmitting unit, comprising:
- means for transmitting Protocol Data Units, PDUs, in a wireless communication network, said PDU comprising protocol headers associated with at least a first and a second protocol layers involved in the communication and a payload to be communicated; and
- means for interacting between the at least first and second protocol layers, such that the sum of the bits of the protocol headers is n-bit aligned independently of non-alignment of at least one of the protocol headers comprised in the PDU, wherein n is a positive integer.

13. The transmitting unit according to claim 12, comprising means for specifying a rule stating that the payload field starts at the first octet aligned position following the total length of the protocol header bits.

14. The transmitting unit according to claim 12 wherein the means for interacting adds a protocol header of the second protocol to a complete PDU comprising at least a header of the first protocol and a payload.

15. The transmitting unit according to claim 12, wherein the means for interacting adds a protocol header of the second protocol to a PDU comprising at least a header of the first protocol and a payload, wherein the header of the first protocol and the payload of the PDU are delivered separately to the second protocol.

16. The transmitting unit according to claim 12, wherein the means for interacting provides padding between the protocol header bits and the payload comprised in said PDU.

17. The transmitting unit according to claim 12, wherein the sum of the bits of the protocol headers is n-bit aligned independently of non-alignment of at least two of the protocol headers comprised in the PDU.

18. The transmitting unit according to claim 12, wherein the means for interacting provides padding to the protocol header bits comprised in said PDU.

19. The transmitting unit according to claim 12, wherein the headers including possible padding are appended to the payload.

20. The transmitting unit according to claim 12, wherein said transmitting unit is comprised in a radio base station.

21. The transmitting unit according to claim 12, wherein said transmitting unit is comprised in a user equipment.

22. A method, comprising:
- communicating a Protocol Data Unit, PDU, between a transmitter unit and a receiver unit in a wireless communication network, said PDU comprising protocol headers associated with at least a first and a second protocol layers involved in the communication and a payload to be communicated; and
- interacting between the at least first and second protocol layers, such that the sum of the bits of the protocol headers is octet aligned independently of non-alignment of at least one of the protocol headers comprised in the PDU.

23. The method according to claim 22, comprising the further step of specifying a rule stating that the payload field starts at the first octet aligned position following the total length of the protocol header bits.

24. A transmitting unit, comprising:
- means for transmitting Protocol Data Units, PDUs, in a wireless communication network, said PDU comprising protocol headers associated with at least a first and a second protocol layers involved in the communication and a payload to be communicated; and
- means for interacting between the at least first and second protocol layers, such that the sum of the bits of the protocol headers is octet aligned independently of non-alignment of at least one of the protocol headers comprised in the PDU.

25. The transmitting unit according to claim 24, comprising means for specifying a rule stating that the payload field starts at the first octet aligned position following the total length of the protocol header bits.

* * * * *